United States Patent
Salcudean et al.

(10) Patent No.: US 6,373,466 B2
(45) Date of Patent: Apr. 16, 2002

(54) ACTIVE JOYSTICK WITH OPTICAL POSITION SENSOR

(76) Inventors: Septimiu E. Salcudean, 4338 West 2nd Avenue, Vancouver B.C. (CA), V6R 1K3; Niall R. Parker, 289 McCallum Road, RR#5 Abbotsford B.C. (CA), V2S 4N5

( * ) Notice: Subject to any disclaimer, the term of this patent is extended or adjusted under 35 U.S.C. 154(b) by 0 days.

(21) Appl. No.: 09/756,524

(22) Filed: Jan. 9, 2001

Related U.S. Application Data (62) Division of application No. 09/190,000, filed on Nov. 12, 1998, now Pat. No. 6,195,083.
(60) Provisional application No. 60/065,787, filed on Nov. 14, 1997.

(51) Int. Cl.[7] .................................................. G09G 5/08
(52) U.S. Cl. ........................ 345/161; 463/38; 250/208.6
(58) Field of Search ................................. 345/161, 156; 356/615, 622, 623, 141.3, 141.5, 144, 147; 463/36–39; 250/208.6

(56) References Cited

U.S. PATENT DOCUMENTS

| | | | | |
|---|---|---|---|---|
| 4,785,180 A | * | 11/1988 | Dietrich et al. ........... | 250/208.6 |
| 4,874,998 A | | 10/1989 | Hollis, Jr. | |
| 5,367,373 A | * | 11/1994 | Busch-Vishniac et al. ...... | 356/139.03 |
| 5,790,108 A | | 8/1998 | Salcudean et al. | |

OTHER PUBLICATIONS

A Six–Degree–of–Freedom Magnetically Levitated Variable Compliance Fine–Motion Wrist; Design, Widely & Control—Hollis et al., vol. 7, No. 3, Jun. 1991 IEEE Transactions on Robotics of Automation.

Lorentz Levitation Technology; A New Approach to Pre Motion Robotics, Teleoperation Haptic Interfiers, and Vibration/Isolation; Hollis & Salcudean—6th Int'l Symposium on Robotics Racism, Oct. 2–5, 1993.
Performance Measures for Haptic Interfiers: Haywood & Astley 7th Int'l Symposium on Robotics Research Oct. 21–24, 1995.
"Design & Control of a Force–Reflecting Teleoperation System with Magnetically Levitated Master & Wrist": Salcudean et al. IEEE Transactions on Robotics of Automation. vol. 11, No. 6, Dec. 1995.
"A Coarse–Fine Approach to Force–Reflecting Hand Control Design"; Stacer & Salcudean IEEE Int'l Conference on Robotics on Automation, Apr. 22–28, 1996.
"Design of Hemispherical Magnetic Levitation Haptic Interface Device" Berkelman et al. 1996 ASME Int'l Miob. Eng. Congress & Exposition Nov. 17–22, 1996, DSL—vol. 56 pp.

* cited by examiner

*Primary Examiner*—Richard Hjerpe
*Assistant Examiner*—Alexander Eisen
(74) *Attorney, Agent, or Firm*—C. A. Rowley (57) ABSTRACT

A joystick composed of a stator formed by an outer cage forming an inner cubic compartment containing an inner cube oriented with its wall spaced from and substantially parallel corresponding wall of the compartment. Opposed magnets are position in cooperating relationship on opposed walls of the compartment and cube and define a gap therebetween. A floater formed by a plurality of flat actuating coils, one positioned in each gap and each thinner than the width of the gap in which it is received. Preferably the ratio of coil thickness to gap width is at least 1:3. Preferably an optical position sensor is used to monitor the relative position of the flotor and stator and is composed of at least one linear light position sensor mounted on one of the stator and flotor and a plurality of planar light beams arranged at an angle to each other on the other of the stator and flotor and directed to the linear light position sensor(s) so that the light beams traverse the linear light position sensor(s).

6 Claims, 11 Drawing Sheets

ACTIVE JOYSTICK WITH OPTICAL POSITION SENSOR

This application is a division of application Ser. No. 09/190,000 filed on Nov. 12, 1998 now U.S. Pat. No. 6,195,083 which claims benefit of Prov. No. 60/065,787 filed Nov 14, 1997.

FIELD OF THE INVENTION

The invention relates to a motion device formed by a flat actuating coil (e.g. a Lorentz voice coil) positioned between magnets having improved rattle space, a joystick with improved geometry incorporating the motion device and to an optical position sensing system

BACKGROUND TO THE PRESENT INVENTION

A number of active joysticks or haptic interfaces (interfaces capable of generating kinesthetic and tactile feedback to the user) have been proposed for virtual environments and teleoperation systems.

Attention is directed to Stocco, L., Salcudean, S. E., "A coarse-fine approach to force-reflecting hand-controller design," in Proc. 1996 IEEE Intl. Conf. Rob. Aut. Minneapolis, MN, pp.~404–410, Apr. 22–28, 1996. for a detailed survey, and to Hayward, V., Astley, O. R., "Performance measures for haptic interfaces," in Proc. ISRR, p.~(12 pages), 1995. for performance measures.

The need for high acceleration in haptic computer-user interfaces has been demonstrated in many studies and seems to have been accepted by designers. Although most reported designs have translational workspaces that exceed a cube with 10 cm sides, it has not been shown that a workspace of this magnitude is really needed. Indeed, for desk-top computing, input devices such as mice, trackballs or joysticks are commonplace. These devices have relatively small motion ranges to avoid tiring the operator. Furthermore, designing high acceleration devices over large workspaces is a non-trivial task requiring expensive actuators, transmissions and joints.

As an alternative, the use of a small workspace haptic device in rate mode or combined position/rate mode has been proposed and demonstrated see Salcudean, S. E., Wong, N. M., Hollis, R. L., "Design and Control of a Force-Reflecting Teleoperation System with Magnetically Levitated Master and Wrist," IEEE Trans. Rob. Aut., vol.~11, pp.~844–858, December 1995.

Magnetically levitated (maglev) Lorentz devices such as those described in Hollis, R. L., Salcudean, S. E., Allan, P. A., "A six degree-of-freedom magnetically levitated variable compliance fine motion wrist: Design, modeling and control," IEEE Trans. Rob. Aut., vol.~7, pp.~320–332, June 1991 and U.S. Pat. No. 5,146,566, issued September, 1992 to Hollis, R. L. and Salcudean S. E are suitable small-motion haptic interfaces because of their low mass, lack of friction and backlash, and high acceleration ability. Devices have been built at IBM (see Hollis, R. L., Salcudean, S. E., Allan, P. A., "A six degree-of-freedom magnetically levitated variable compliance fine motion wrist: Design, modeling and control," IEEE Trans. Rob. Aut., vol.~7, pp.~320–332, June 1991); at University of British Columbia (see Salcudean, S. E., Wong, N. M., Hollis, R. L., referred to above), and at Carnegie-Mellon University (see Berkelman, P. J., Butler, Z. H., Hollis, R. L., "Design of a hemispherical magnetic levitation haptic interface device," in Proc. 1996 ASME IMECE, vol.~DSC-58, Nov. 17–22, 1996).

In such devices magnetic forces are used to actively levitate a rigid mass or flotor to which the handle manipulated by the operator is attached. These devices share the following three subsystems:
 (i) an actuation system consisting of at least six flat voice-coil or Lorentz actuators,
 (ii) an optical position sensing system consisting of infrared linear light rays projecting from light-emitting diodes or lasers onto two-dimensional lateral effect photodetectors or position sensing diodes,
 (iii) a control system that commands forces and torques to the actuation system based on the desired and sensed position, the desired force and the desired relationship between force and position (mechanical impedance).

A number of applications of maglev devices are described in the survey paper Hollis, R. L., Salcudean, S. E., "Lorentz levitation technology: a new approach to fine motion robotics, teleoperation, haptic interfaces, and vibration isolation," in Proc. 5th Intl. Symp. on Robotics Research, (Hidden Valley, Pa.), p.~(18 pages), Oct. 1–4, 1993.

U.S. Pat. No. 5,790,108 issued to Salcudean et al. on Aug. 4, 1998 describes a specific application of the Lorentz voice coils in a hand controller.

BRIEF DESCRIPTION OF THE PATENT INVENTION

It is object of the present invention to provide voice-coil actuators with significantly larger "rattle space" or significantly higher forces for a given "rattle space".

Broadly the present invention relates to a basic actuator structure comprising a stator formed by a pair of opposed magnets defining a gap therebetween a floater formed by a flat actuator coil interposed in the gap. The gap has a width d and the flat coil has a thickness $d_c$ and the ratio of coil thickness $d_c$ to gap width d is between ⅓ and ½ ($d_c/d=⅓$ to ½) to provide a larger rattle space without sacrificing force applied between the coil and magnets.

It is a further object of the present invention to provide a new actuation system geometry, providing a well conditioned transformation from actuator currents to resultant forces and torques, to produce uniformly distributed commanded forces and torques, Broadly the present invention relates to a joystick structure comprising a stator formed by an outer cage with an internal cube shaped compartment and a cube mounted within the compartment with each cube face of said cube in opposed relation with a corresponding face of said compartment, opposing pairs of magnet assemblies one magnet assembly of each pair mounted on a cube face and the other on the corresponding opposed face of said compartment, each said pair of magnet assemblies defining a gap therebetween, a flotor formed by a plurality of flat actuating coils held in fixed relationship with respect to each other and positioned one of said coils in each of said gaps, said magnetic assemblies on three of said cube faces forming a vertex being oriented with their longitudinal axes substantially parallel to the cube diagonals emanating from said vertex, and said assemblies on the remaining three of the cube faces forming an opposite vertex being oriented with their longitudinal axes substantially perpendicular to the cube diagonals emanating from said opposite vertex and each said coils having their longitudinal axes substantially parallel to the longitudinal axis of said pair of magnet assemblies between which it is interposed.

Preferably said stator compartment and said cube are arranged with one of their major diagonal axes substantially vertical.

It is yet another objective of the present invention to provide a new optical position sensor that is significantly less expensive than sensing systems used in other maglev devices, even though it provides similar sensing volume and resolution.

Broadly the present invention relates to an optical position sensor comprising at least one linear position-sensing diode mounted on one of a stator or a floater and a plurality of planar light beam projectors on the other of the stator and flotor with the light beam projectors projecting light beams at an angle to each other, said angle being greater than zero and said light beams traversing said at least one linear light position sensor at a plurality of spaced locations when in a field of operation of said optical position sensor and means for separately identifying said light beams.

Preferably said means for separately identifying said light beams is selected from the group of means for activating said light beams one at a time and means for varying intensities of said light beams at different frequencies.

Preferably said linear light position sensor are mounted in the same plane.

Preferably said plurality of planar light beams comprises two and said two light beams are substantially perpendicular.

Preferably said linear light position sensors are arranged in a plane as a triangle and said plurality of light beams comprises three planar light beams arranged to project light along the adjacent faces of a pyramid with its vertex pointing towards said plane and projecting a light triangle onto said plane.

Preferably said linear light position sensor triangle is substantially equilateral and said pyramid is substantially a cubic pyramid.

Preferably said light is infrared light.

BRIEF DESCRIPTION OF THE DRAWINGS

Further feature, objects and advantages of the present invention will be evident from the detailed description of the present invention taken in conjunction with the accompanying drawings in which.

DETAILED DESCRIPTION OF THE PREFERRED EMBODIMENTS OF PRESENT INVENTION

Basic Actuator Structure

Figures 1, 1A:
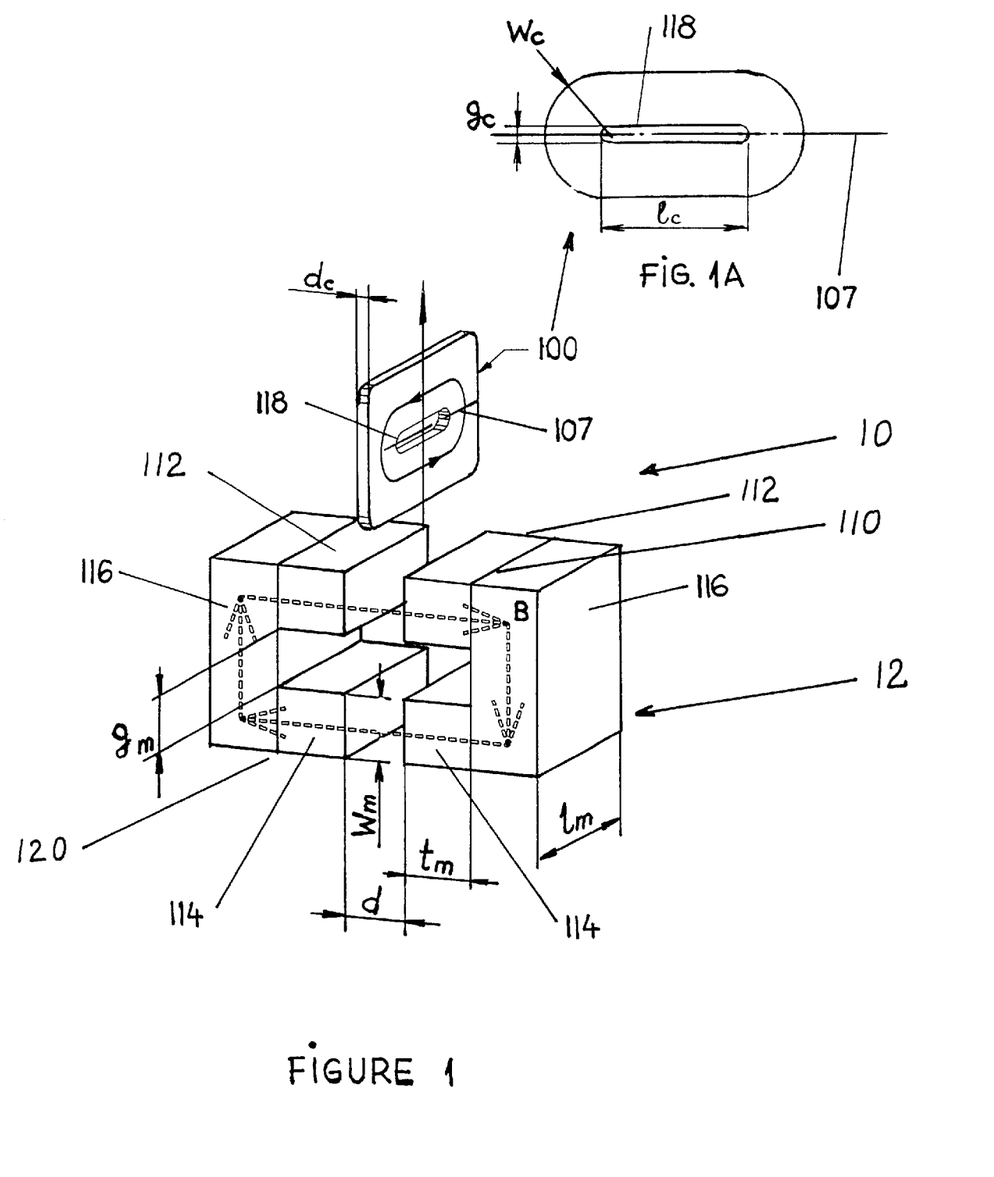
FIG. 1 is an isometric illustration of a flat actuating coil (Lorentz voice coil) positioned between a pair of opposed cooperating magnets that forms the basic actuator structure of the present invention.
FIG. 1A is a plan view of the voice coil of FIG. 1 indicating the various dimensions used to optimize the design.

The basic actuator structure 10 as shown in FIGS. 1 and 1A is composed of a flat coil 100 interposed in a magnetic assembly 12 between a pair of cooperating magnet assemblies 110 and 120. Each magnet assembly is composed of a pair of magnets 112 and 114 mounted on and coupled together via magnetically permeable (soft iron, for example) return plates 116 to generate a magnetic field as indicated by the arrows B. The field interacts with the coil current as indicated by the arrows I to generate a Lorentz force as indicated by the vector F. For clarity, the coil 100 is shown translated upwards along the direction of its force F, but its nominal position is in the middle of the magnetic assembly.

In the system illustrated in FIG. 1 the various dimensions of the elements have been designated as follows; the magnet width $w_m$, the magnet thickness $t_m$, the magnet length $l_m$, the magnet spacing $g_m$, the coil 100 thickness $d_c$, the magnetic gap length d, and the coil 100 "rattle space" between the adjacent opposed magnets 112 and 114 measured in a direction orthogonal to the coil 100 is designated $d_r$ and is equal to $d-d_c$ i.e. $d_r=d-d_c$.

The coil 100 as indicated in FIG. 1A is formed around a core (may be simply an air space) to form a core or gap 118 having a length designated as $l_c$ a gap width $g_c$ and a coil width $w_c$.

The coil can be wound by using flat or other conducting material wire. For the purposes of defining (calculating the dimensions for) base structure 10 the coil wire length has been designated $l_{wire}$, and the coil "packing efficiency" $\eta_{pack}$, i.e., $\eta_{pack}=s_{eff}/s_{wire}$, the ratio of conducting cross sectional area $s_{eff}$, to total cross sectional area, that is conducting plus insulating, cross-sectional area $s_{wire}$. Note that $\eta_{pack}$ depends on the wire cross-sectional shape (best packing achieved by flat wire), and the ratio of insulating material to conducting material.

For the purposes of determining the design formula (equation 6 below) let $\rho$ be the coil conductor resistivity; R the coil resistance; $P_{coil}$ the power dissipated in the coil, and I the coil current.

The actuator force is given by Lorentz's law. To obtain the design formula (equation 6 below), it is assumed that (i)~the flux crossing the coil is a constant $B_g$,
(ii)~fringing fields are negligible, i.e., the flux outside the magnet projection through the coil is negligible. Implicit in this assumption is that the magnet projection through the coil is completely contained in the coil, i.e., $g_c \leq g_m$, $l_m \leq l_c$, and $w_m+g_m<w_c+g_c$ For the actuator in FIG. 1, given assumption (ii), the length of wire that produces a force is given by $l_{eff}=2l_m w_m d_c/s_{wire}$.

Then, if $\eta_{geom}=2\, l_m w_m d_c/(s_{wire}l_{wire})$=(coil volume producing force/total coil volume) is an efficiency factor determined by the coil geometry, we obtain the following expression for the actuator force:

$$F(B_g, d, l_m, w_m) = B_g l l_{eff} \quad (1)$$

$$= B_g \sqrt{\frac{P_{coil}}{R} \frac{2 l_m w_m d_c}{S_{wire}}} \quad (2)$$

$$= B_g \sqrt{\frac{P_{coil}}{\frac{\rho l_{wire}}{\eta_{pack} S_{wire}}} \frac{2 l_m w_m d_c}{S_{wire}}} \quad (3)$$

$$= B_g \sqrt{\eta_{pack}} \sqrt{\frac{P_{coil}}{\rho}} \sqrt{\frac{1}{S_{wire} l_{wire}}} 2 l_m w_m d_c \quad (4)$$

$$= B_g \sqrt{\eta_{pack}} \sqrt{\eta_{geom}} \sqrt{\frac{P_{coil}}{\rho}} \sqrt{2 w_m l_m d_c} \quad (5)$$

$$= B_g \sqrt{\eta_{pack}} \sqrt{\eta_{geom}} \sqrt{\frac{P_{coil}}{\rho}} \sqrt{2 w_m l_m (d - d)_r} \quad (6)$$

For the coil shown in FIG. 1, $$\eta_{geom} = 2 l_m w_m / (2 l_m w_m + \pi w_m^2 + 2 w_m g_c d_c) \approx 2 l_m w_m / (2 l_m w_m + \pi w_m^2),$$

and is approximately 60% when $l_m = 20$ mm, $w_m = 8$ mm. Packing efficiencies for conventional coils (round copper wire) are about 75%, while flat copper coils reach efficiency values close to 95%.

Assuming that the actuator flux in FIG. 1 is steered perfectly by the soft iron back-plates, the field in the center of the gap aligned with the center of the magnet can be calculated by replacing the actuator magnets with equivalent solenoids and using the Biot-Savart Law. see {Magnet Sales \& MFG Co. 1996 Catalog}, "High performance permanent magnets." 11248 Playa Court, Culver City, Calif. 90230 which is incorporated herein by reference.

$$B_g(d, l_m, w_m, t_m) = \frac{2 B_r}{\pi} \left[ \tan^{-1} \frac{w_m l_m}{d \sqrt{d^2 + l_m^2 + w_m^2}} - \tan^{-1} \frac{w_m l_m}{(4 t_m + d) \sqrt{4(t_m + d)^2 + l_m^2 + w_m^2}} \right] \quad (7)$$

where $B_r$ is the magnetic material residual flux.

Substituting (7) in (6), one can relate the actuator dimensions to the resulting force. An additional lower bound of the form $t_s \geq \alpha w_m$ can be imposed on the iron return plates thickness in order to avoid saturation, where $\alpha$ is a constant determining the maximum relative width of iron return plate 120 to magnet 110 that avoids saturation. With appropriate inequality constraints to account for the desired geometrical dimensions, e.g., $$2 t_s + 2 t_m + d \leq d_{max},$$

a maximum actuator thickness, or $l_m + 2 w_m \leq \alpha_{max}$, a maximum flotor cube size, $t_m, w_m, l_m$, and $d$ that a maximize actuator force can be obtained by solving a nonlinear mathematical program as described in a number of available texts. The geometrical efficiency $\eta_{geom}$ increases with the ratio $l_m/w_m$, (or $l_c/w_c$) while $l_m + 2 w_m$ will be bounded by flotor size.

In practice, $l_m$, $w_m$ are often selected separately as a function of flotor geometry, desired motion and force range and desired force linearity. Then the magnet thickness $t_m$ and the magnetic gap d are selected by substituting equation (7) into (6), plotting the actuator force $$F(B_g(d, t_m))$$

as a function of the magnetic gap d for a number of magnet thicknesses $t_m$, and choosing the maximizing magnetic gap d. The optimal coil width is recovered as $d_c = d - d_r$. This is the best coil-width for a given coil rattle space. By "best coil" we mean the one that generates the highest force for a given power dissipated in the coil, and by rattle space we mean the range of translation of the coil in a direction normal to its surface (parallel to the gap). The rattle space determines the motion range of the flotor.

Figure 2:
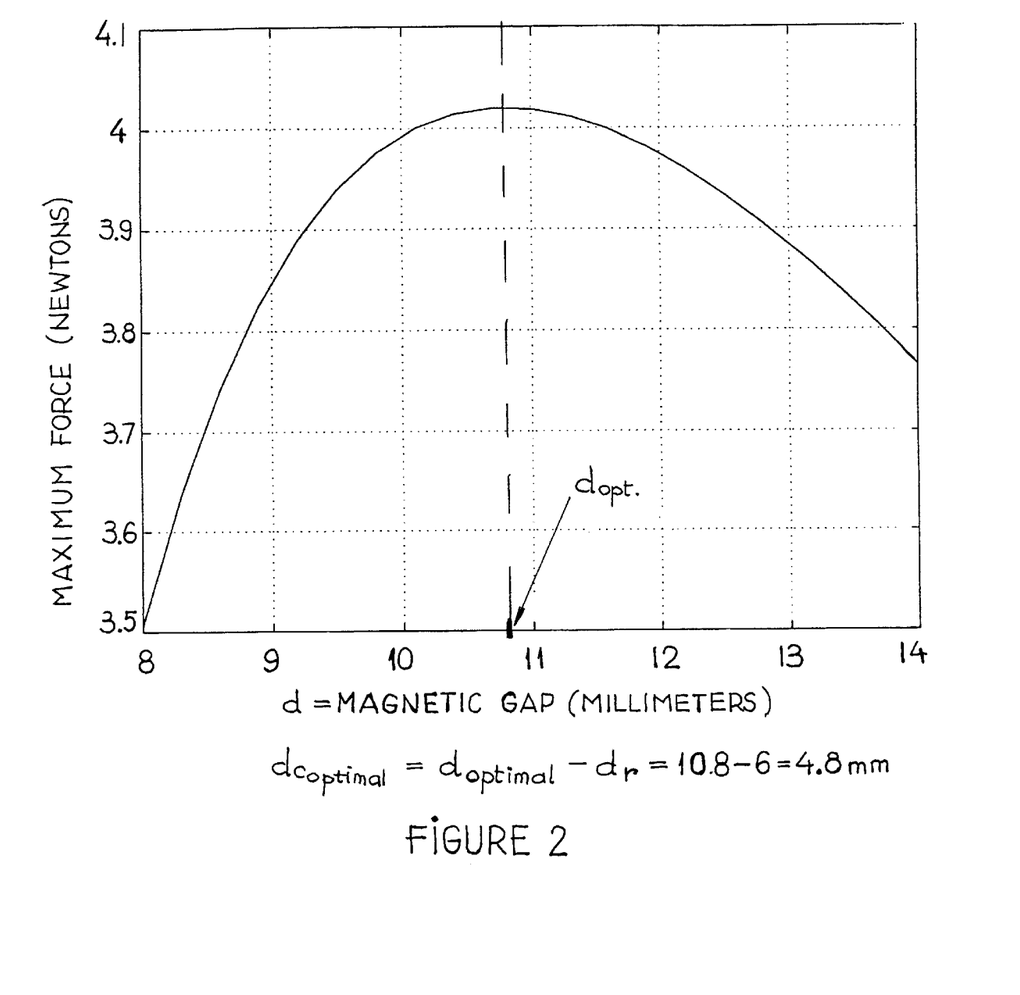
FIG. 2 is a plot of Maximum force vs. magnetic gap d showing the effect of gap and coil thickness on the force that may be generated.

Such a plot is shown in FIG. 2, obtained from (7) and (6) with magnet dimensions $l_m = 20$ mm, $w_m = 8$ mm, $t_m = 4$ mm, and required rattle space $d_r = 6$ mm. The optimum gap length is found to be $d_{optimal} = 10.8$ mm, with corresponding optimum coil width of $d_{c_{optimal}} = 4.8$ mm. This leads to a coil width to magnetic gap width of the order of 1:2.

It is to be noted that the coil width to magnetic gap ratio is substantially larger in this design than in all other reported maglev joystick designs (Hollis et. al., 1991), (Salcudean et. al., 1995), (Berkelman et. al., 1996) all of which are referred to above and incorporated herein by reference. Indeed, prior coil width to magnetic gap ratios are of the order of 1:7. Coils with such gap ratios are nowhere near as efficient as larger coil width to gap ratios of the present invention namely greater than 1:3.

Furthermore, note that the above formulation does not involve the coil resistance, only the power dissipated in it, its resistivity and geometrical properties. Thus the coil resistance can be selected for maximum power transfer from the power amplifier after finding its dimensions. The wire gauge can then be selected to give $R = 8$ $\Omega$ in order to match available current drivers. Although the predicted actuator force is correct only in the middle of the gap, when the flotor is in its nominal center, the magnetic field formula (7) can be extended to give the field along the magnet center line (see Magnet Sales, 1996) and lead to a more accurate computed actuator force. However, it was found that predicted force and field values compare well with experimental ones with small errors (less than 5%) in several actuator designs of various sizes.

The coil design optimization approach presented above has areas of application outside magnetic levitation systems. Indeed, coreless motors such as the Maxon 80 motors can be optimized for torque in low-speed applications in a similar manner, loudspeaker coils, especially woofers and subwoofer can be optimized in a similar fashion.

Joystick Structure

The joystick device has six basic actuators as used before in a number of designs (see Hollis et. al., 1991 referred to above and incorporated herein by reference), however it is preferred to employ the improved basic actuator as described above in conjunction with FIGS. 1, 1A and 2.

Figure 3:
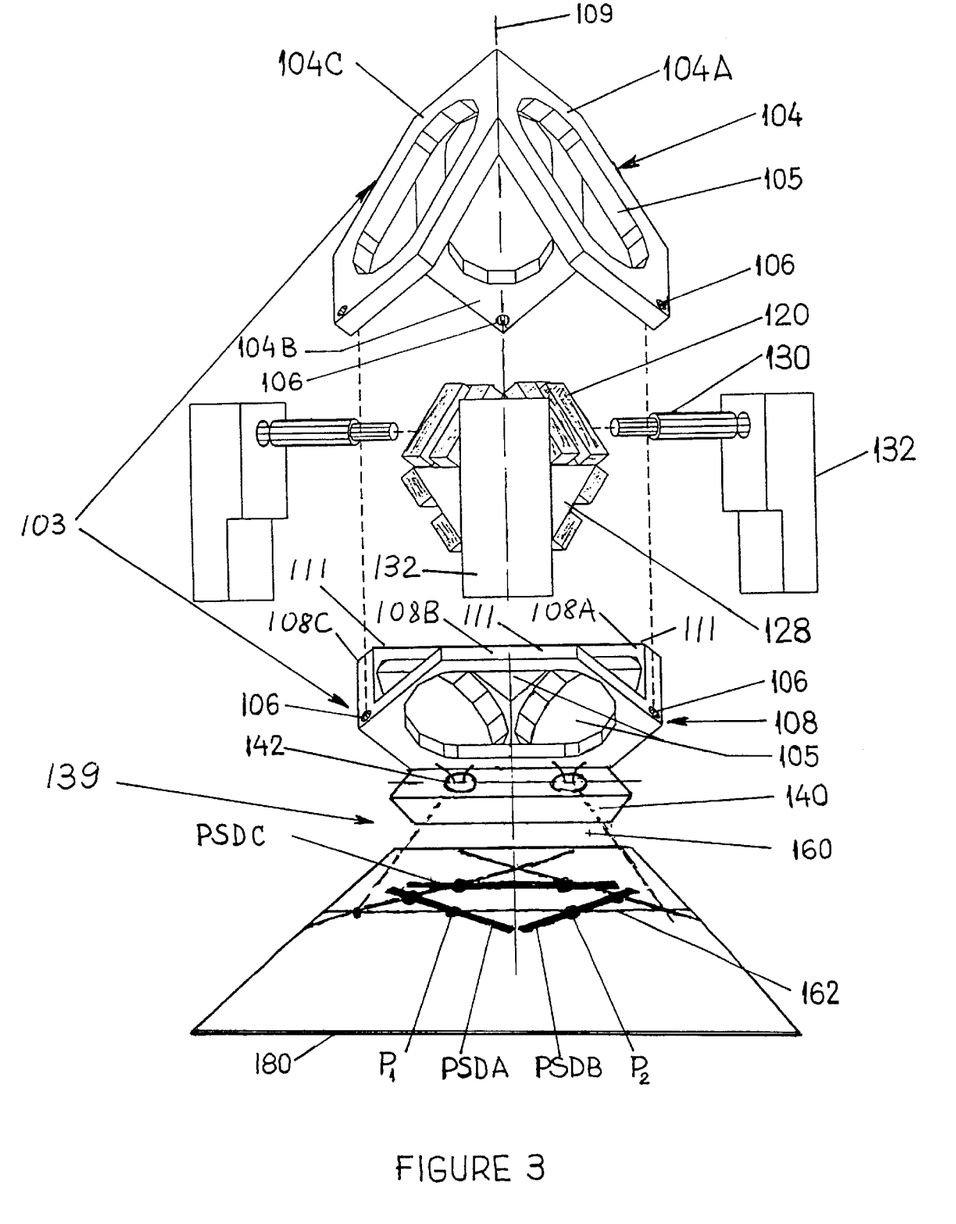
FIG. 3 is an exploded view of the structure the actuator device joystick) of the present invention with parts omitted but showing the optical sensor of the present invention mounted in sensing position.
Figure 4:
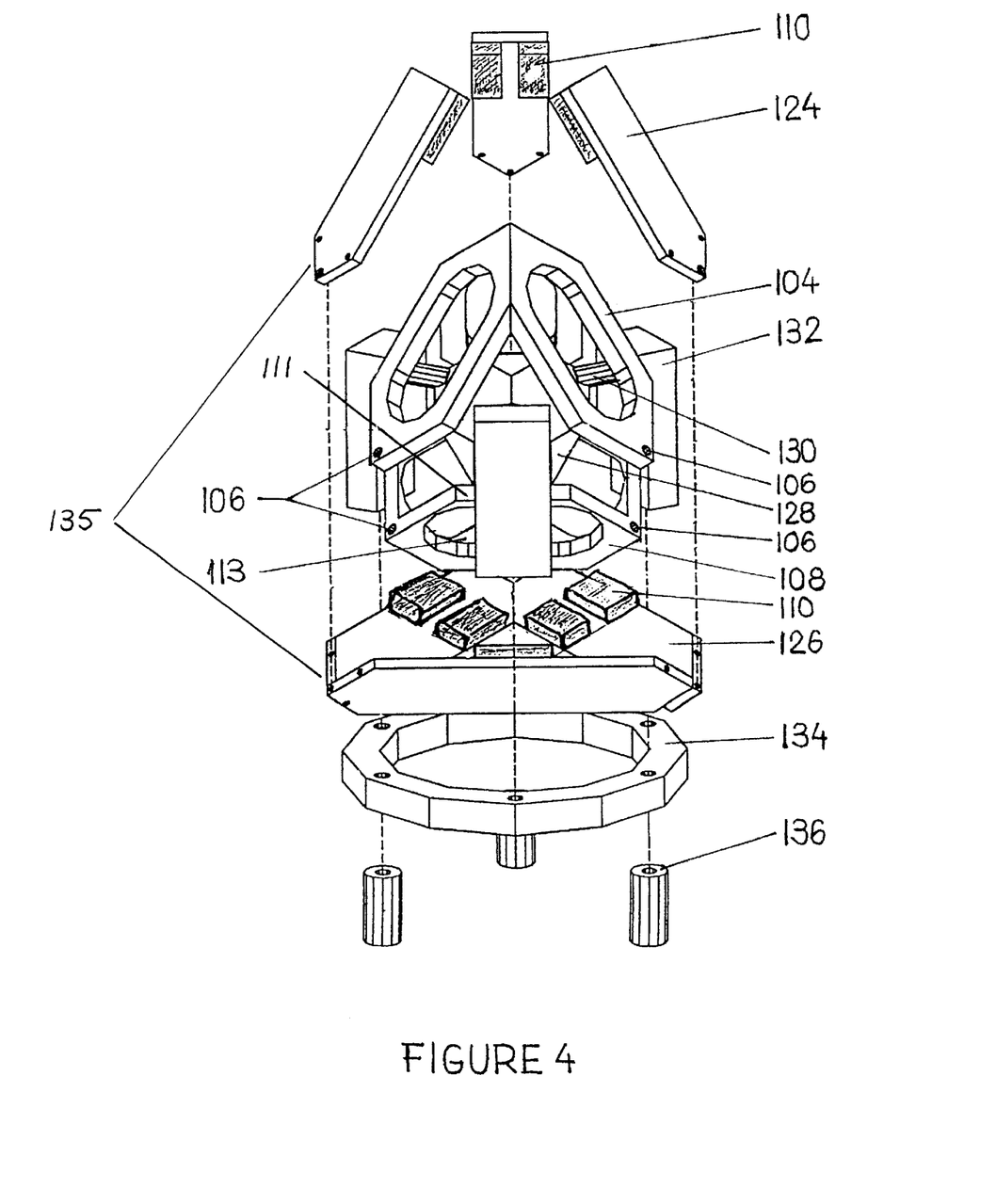
FIG. 4 is a view similar to FIG. 3 but with the sensor omitted.
Figure 5:
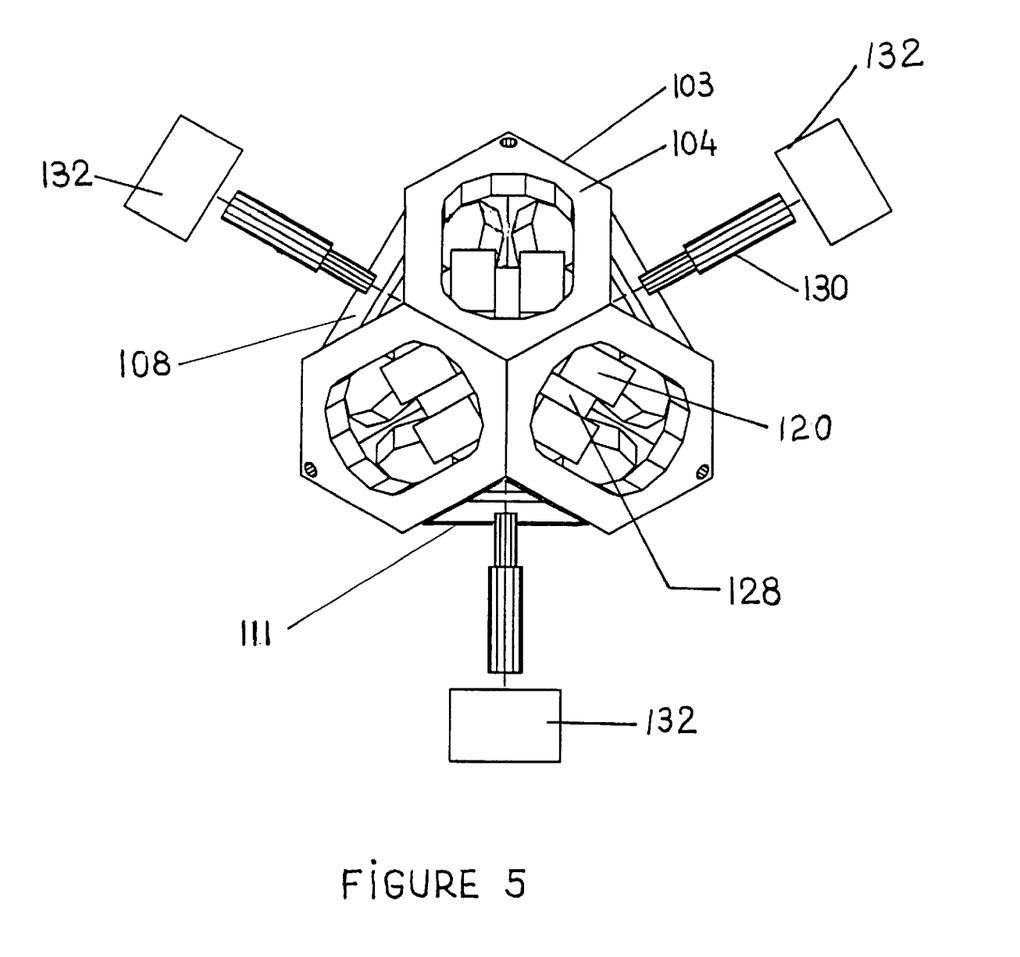
FIG. 5 is a partially exploded plan view of the structure of the actuator device with parts omitted.

As shown in FIGS. 3, 4, and 5 in exploded condition the flotor 103 of the present invention is formed as a cubic shell formed by coupling together an upper structure 104 and a lower structure 108 each forming in effect ½ the cube. The cube halves 104 and 108 are in the illustrated arrangement secured together by bolts (not shown) passing through the bolt holes 106 (holes 106 on the part 108 in the illustrated arrangement are threaded).

Each of the cube halves 104 and 108 are formed by 3 symmetrically positioned coil mounting portions 104A, 104B, 104C and 108A, 108B and 108C respectively each of which has a coil receiving aperture 105 in which the coils (not shown) are oriented so that their longitudinal axes 107 (see FIG. 1 and 1A) are along the diagonals of their respective each cube face portions 104A, 104B, 104C, 108A, 108B and 108C. It will be noted that the coils 100 on the portion 108 (in rest position) will have their longitudinal axes substantially horizontal and that the longitudinal axes 107 of those in portion 104 are in planes substantially perpendicular to the those in the bottom portion 108.

In its nominal or rest position, the cubic flotor structure 103 is centered within the magnetic gaps with one of its main diagonals (centerline 109) being vertical.

The stator structure 135 includes plates 124 and 126 which mount the outer magnetic assemblies 110 (outside the shell of flotor 103) and an internal cube 128 which mounts cooperating internal magnet assemblies 120 (internal of the shell of the flotor 103) and of course their mountings.

The cube 128 on which the internal magnet assemblies 120 are mounted is supported with one of its main diagonals vertical. In the rest position of the flotor 103 this main diagonal substantially aligned with the main axis 109 of the flotor structure and therefore is designated by the same reference number 109. The cube 128 is supported in this position by three cylindrical posts 130 attached to support structures 132. The posts 130 pass through passages through the floater 103 formed by truncating the portions 108A, 108B and 108C as indicated at 111 (see FIGS. 3 and 4).

The internal magnet assemblies 120 are mounted along the diagonals of a permeable iron cube 128. Magnet assemblies 120 on the lower half of the cube 128 (cooperating with the portion 108) are oriented with their longitudinal axes (axis extending substantially perpendicular to the dimension $g_m$ designating the width of their gaps) extending substantially horizontal i.e. perpendicular to the axis 109 and the longitudinal axes of the magnet assemblies on the upper half (cooperating with portion 104) extending along substantially vertical planes i.e. intersect to the axis 109. In other words the magnetic assemblies mounted on one set of three cube faces of the cube forming a vertex are oriented with their longitudinal axes substantially parallel to the cube diagonals emanating from that vertex, and the magnetic assemblies on the remaining three of the cube faces that form the opposite vertex are oriented with their longitudinal axes substantially perpendicular to the cube diagonals emanating from the opposite vertex.

Magnet assemblies 110 external to the coil shell 103 are mounted on cantilevered permeable iron plates 124 and 126 which combine to form a cubic chamber or compartment in which the cube 128 and its magnet assemblies 120 are contained so that each face of the cube 128 is opposite its corresponding wall of the cubic compartment. Each external magnet assembly 110 is mounted on the plate 124 or 126 in opposing position with the internal magnet assembly 120 on the opposing face of the cube 128 (i.e. the face of the cube 128 facing its plate 124 or 126) and thus the cooperating magnet assemblies 110 and 120 on each pair of opposing faces of compartment formed by the plates 124 and 126 the opposing face of the core 128 are positioned to cooperate and act on the coil 100 (not shown in FIG. 3, 4 or 5) interposed therebetween i.e. the coils 100 on upper shell portion 104 cooperate with magnet assemblies 110 and 120 on the plate 124 and upper half of the cube 128 and the coils 100 on the lower portion 108 cooperate with the magnet assemblies 110 and 128 on the permeable iron plates 126 and the lower faces of the cube 110.

Each coil 100 is oriented with respect to the magnet assemblies 110 and 120 between which it is interposed with its longitudinal axis 107 substantially parallel to the longitudinal axis of its assemblies 110 and 120.

The magnetic field return plates 124 mount on the magnetic field return plates 126 which in turn are attached to a ring 134 and posts 136 mounted onto the base of the device. The posts 132 are also mounted on the ring structure 134 to form the stator structure 135.

A printed circuit board(PCB) 180 (see FIG. 3) fits under the base 134 of the stator 135 formed by the plates 124 and 126 and posts 132 mounting the cube 128 and the base 134. The circuit board 180 carries the device sensing and power electronics and a microcontroller as will be described below.

For clarity, FIG. 3 shows the iron cube 128 internal to the cube with the magnets 120 attached to it, while FIG. 4 shows the magnets 110 attached to the external cube but not the external magnets 120.

As shown in FIGS. 3, 4 and 5, because the flotor coils are arranged along the diagonals of a cube as shown, four of the cube vertices can be cut away i.e. the cut aways 111 described above and a large cut in the bottom vertex of the lower flotor structure 108 as indicated at 113 in FIG. 4.

A handle or other payload (not shown) can be mounted on a vertical shaft penetrating the top vertex of the upper flotor structure 104. The support posts 130 shown in FIGS. 3 and 5 may be set to locate the stator relative to the PCB and sensor, closer to one of the PCB sides, thus allowing a tapered surface for the user's forearm and wrist to rest on.

Figure 6:
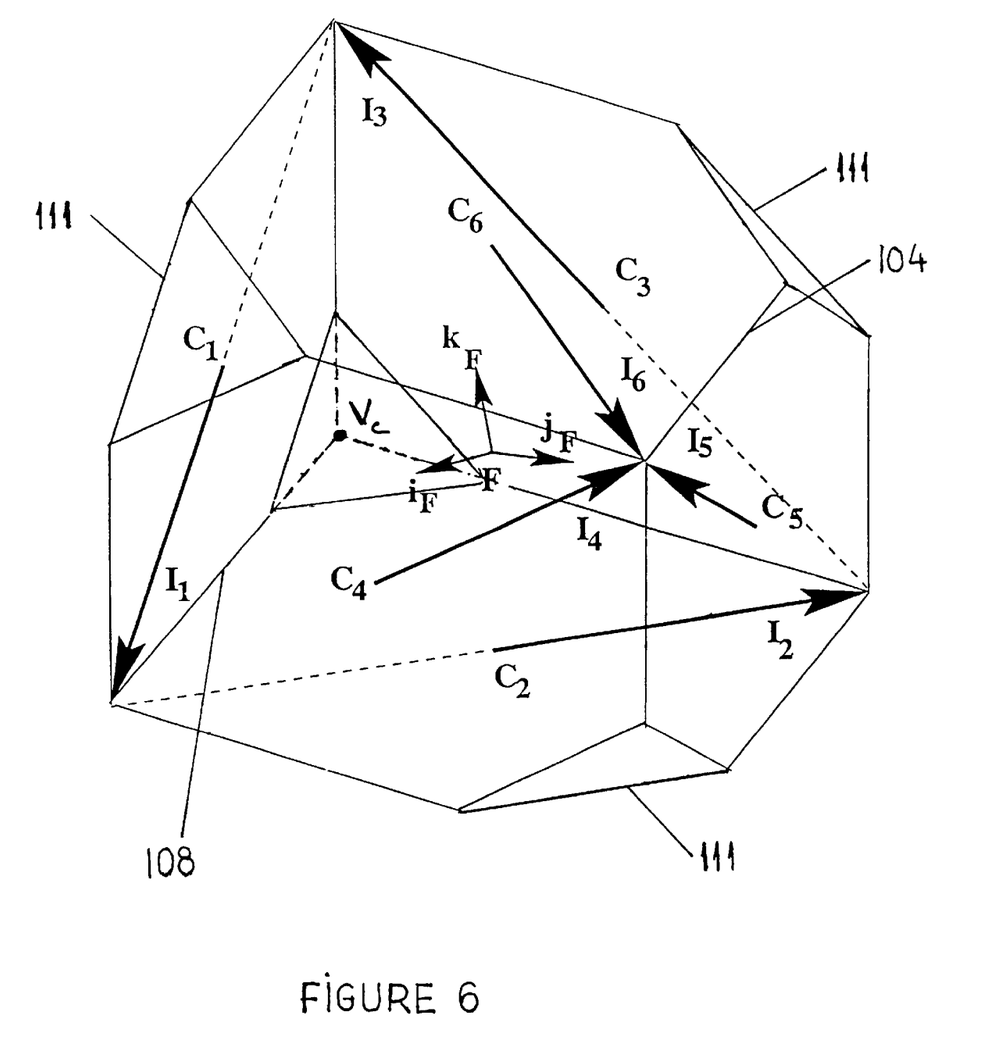
FIG. 6 is a schematic illustration of vectors aligned with the coil current directions generated by operation of the coils in the structural arrangement illustrated in FIGS. 3, 4 and 5.

The cut vertices are also shown schematically in FIG. 6.

The magnetic gaps allow the flotor 103 to translate and rotate in arbitrary directions and about arbitrary axes, respectively, within the confines of the magnetic gaps.

The rotational and translational workspaces do not decouple in this design, unlike in the spherical geometry suggested in (Berkelman et. al., 1996 referred to above). However, the angular motion of the flotor is substantial (typically ±10°) from nominal, and is actually limited in a current model by the optical sensor range, not by mechanical interference.

An optical position sensor a preferred form of which will be described hereinbelow fits under the flotor structure 108 and projects lines onto position sensing diodes mounted on the circuit board 180.

Device Modeling

The device modeling used for the present invention follows closely the approach from Hollis et. al., 1991 referred to above and incorporated herein by reference.

The flotor is represented schematically in FIG. 6. $C_1$ through $C_6$ denote the actuator coil centers. $I_1$ through $I_6$ are parallel to the currents flowing through the straight parts $l_c$ of the coils 100.

In the nominal position, the resultant force-torque vector acting on the flotor is computed by summing the forces $f_i$ and torques $FC_i \times f_i$, where $f_i$ is computed by taking the vector product $I_i \times B_i$ of the current vectors $I_1, \ldots, I_6$ and the magnetic field vectors $B_1, \ldots, B_6$ (these are outward normals to the faces of the cube and are not shown). These calculations are first done with respect to a vertex coordinate system centered at $V_C$ with unit vectors along the cube edges, then they are transformed to the coordinate system $\{F_i[i_F, j_F, k_F]\}$ located at the center of the cube and having $k_F$ aligned with the vertical (in FIGS. 3 and 4 the plane of vertices $V_A, V_B, V_C$ is horizontal). A resultant 6×6 matrix A mapping unit coil currents to flotor forces and torques can be obtained in this coordinate system from the device geometry and an actuator force gain. For example, if the cube has its side equal to 50.5 mm and the predicted actuator force per unit of current is of 4 N/A, the transformation matrix A is given by:

$$A = \begin{bmatrix} -1.15 & 2.31 & -1.15 & -3.46 & 3.46 & 0 \\ -2.00 & 0 & 2.00 & -2.00 & -2.00 & 4.00 \\ -3.27 & -3.27 & -3.27 & 0 & 0 & 0 \\ -0.10 & 0 & 0.10 & 0.03 & 0.03 & -0.07 \\ 0.06 & -0.12 & 0.06 & -0.06 & 0.06 & 0 \\ 0 & 0 & 0 & 0.09 & 0.09 & 0.09 \end{bmatrix}$$

The first three rows of A have units of N/A, the next three Nm/A. It is worthwhile noting that A has two groups of equal singular values 5.66, 5.66, 5.66 N/A and 0.16, 0.16, 0.16 Nm/A corresponding to forces and torques, their scaled values giving the maximum forces and torques that would be obtained with a given power supply if all coil resistances were identical. Thus this geometry distributes the power load across the actuators in a uniform manner.

Optical Position Sensor

A novel optical sensor 139 to determine the position and orientation offsets of the flotor 103 with respect to the stator 135 will now be described with reference to FIGS. 3 and 7 through 11.

As shown in FIG. 3, the optical position sensor consists of a planar infrared beam generator 140 mounted on the flotor 103, and three linear light position sensors, such as, linear lateral effect position sensing diodes (PSD's)—PSD A, PSD B and C, mounted on the PCB plane 180 under the flotor 103.

Figures 7, 7A:
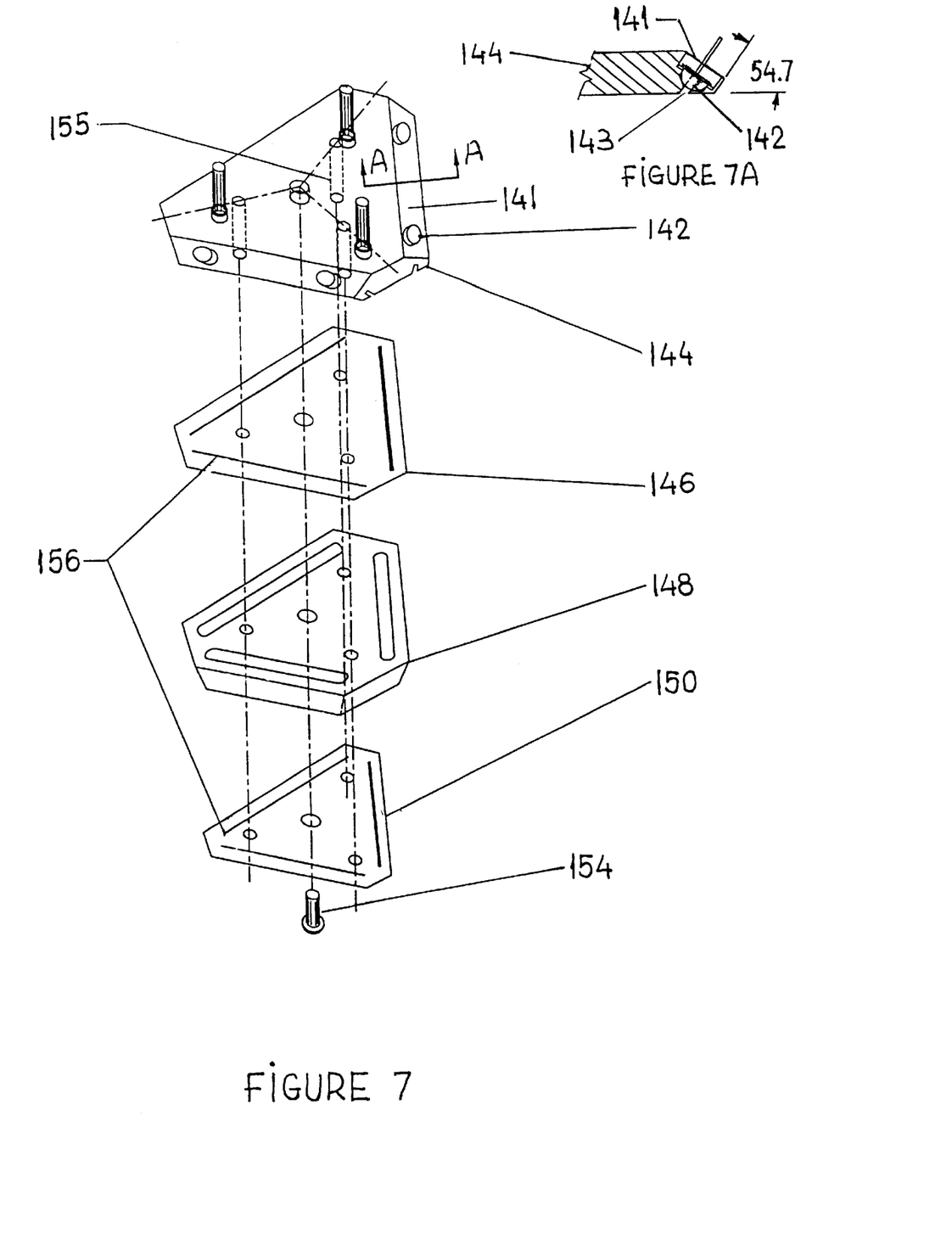
FIG. 7 is an exploded view of the beam generator portion of the optical sensor of the present invention.
FIG. 7A is a section along the line A—A of FIG. 7.

An embodiment of an infrared beam generator is explained in detail in FIGS. 7 and 7A. A number (two shown) of wide angle light emitting diodes (LED's) 142 are mounted on each of the three mounting faces 141 of an LED holder 144 with 120 degree symmetry. Deep and wide slits 143 perpendicular to the mounting faces are cut in the LED holder allowing infrared light to emanate along orthogonal planes 160 (illustrated in FIG. 8) of a light cube.

Two precision masks 146 and 150 with slits 156 are used to insure that the light planes emanating through the wide slit 143 have little divergence and are precisely aligned to form the faces of a cubic pyramid. Precise alignment can be achieved by the use of locator pins 155 as illustrated in FIG. 7.

Figure 8:
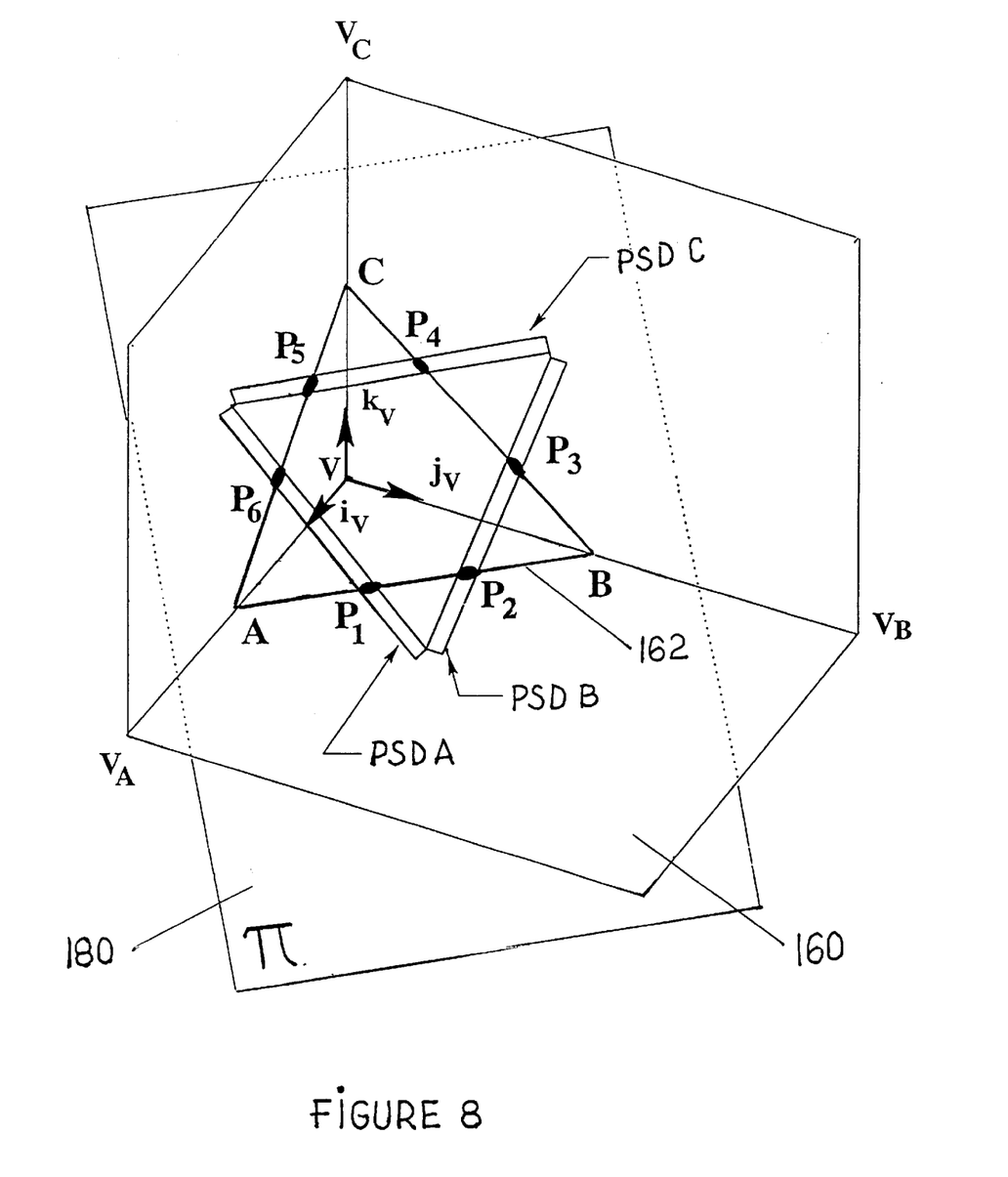
FIGS. 8 and 9 are schematic views illustrating the operation of the optical sensor of the present invention.
Figure 9:
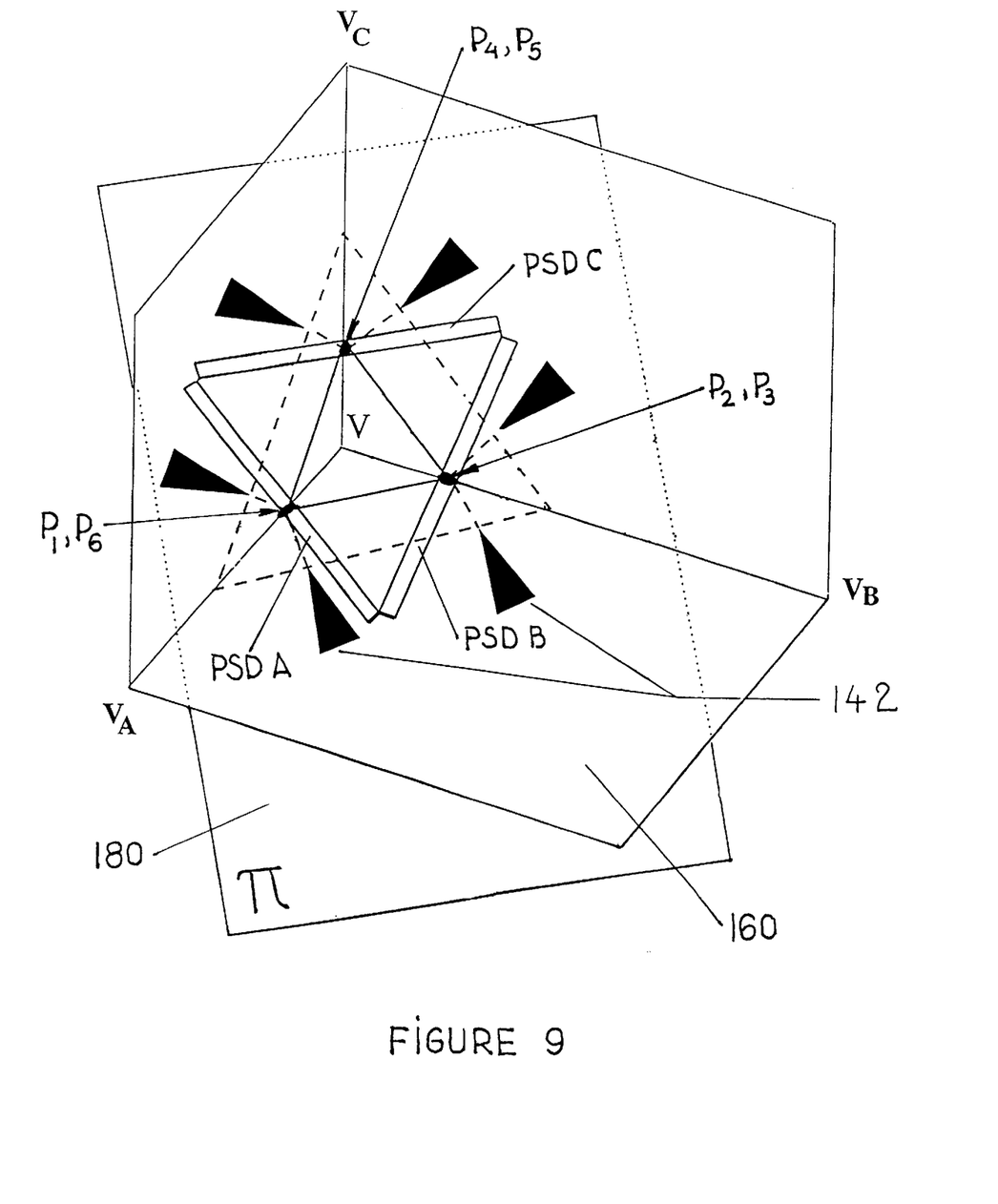

As shown in FIGS. 8 and 9, the light planes 162 coincide with the faces $V_A V V_B$, $V_B V V_C$, and $V_C V V_A$, of a cube. Note that in this particular device design, these faces are parallel to the faces of the lower flotor structure 108, but that is not necessary for other designs.

Other ways of generating orthogonal light planes along the faces of a cube are possible and are obvious to those skilled in the art.

The PSDs PSD A, PSD B and PSD C are mounted on the PCB plane 180 along the sides of an equilateral triangle.

The operation of PSDs is well known—see, for example, (U.S. Pat. No. 4,785,180 Dietrich et. al., or {Dietrich J., Plank, G.}, "{Optoelectronic System Housed in a Plastic Sphere}," 1988. The position of a focused light beam (preferably infrared) projected onto the PSD active area can be obtained by measuring the PSD electrode currents. Position along the PSD axis is computed by dividing the difference between the electrode currents by the sum of the electrode currents.

The optical position sensor is controlled by the board 180 and operates as follows (see FIGS. 3, 8 and 9). Each of the light planes 160 are turned on {in sequence}, first $V_A V V_B$, then $V_B V V_C$, then $V_C V V_A$, at high frequency, by a microcontroller. When $V_A V V_B$ is ON, the positions of its intersections $P_1$ and $P_2$ with PSD A and PSD B, respectively, are detected by measuring the PSD currents in synchronization with the flashed light plane. When $V_B V V_C$ is ON, the positions of its intersections $P_3$ and $P_4$ with the active areas of PSD B and PSD C, respectively, are detected. When $V_C V V_A$ is ON, the positions of its intersections $P_5$ and $P_6$ with PSD C and PSD A, respectively, are detected.

In a particular embodiment of this optical position sensor, the nominal flotor position with respect to the PSDs can be defined such that points $P_1$ and $P_6$ collapse into one point, and so do the pairs $P_2$, $P_3$ and $P_4$, $P_5$ as shown in FIG. 9.

The position of the moving flotor with respect to a coordinate system attached to the stator (and the PCB) can be obtained from coordinates of the points $P_i$, i=1, ... ,6 in the PCB plane 180. First, the intersections A of line $P_1P_2$ with $P_5P_6$, B of $P_1P_2$ with $P_1P_4$, and C of $P_3P_4$ with $P_5P_6$, are computed.

As shown in U.S. Pat. No. 5,059,789 issued to Salcudean, October 1991, the light vertex V can be computed easily as the point of intersection of three spheres of diameters $\|AB\|$, $\|BC\|$, $\|CA\|$, passing through A and B, B and C, and C and A, respectively. Indeed, the loci of V such that the angles (VA, VB), (VB,VC) and (VC,VA) are 90° are spheres with diagonals AB, BC and CA. Once V is located, $[i_V, j_V, k_V]$ can be computed by normalizing VA, VB, VC.

Note that similar sensors can be constructed by using three light planes that intersect three linear PSDs (or linear CCDs) and solving the associated direct kinematic equations numerically via an iterative method such as Newton's method. In general, a system of six equations with six unknowns describing a geometry consistent with the measurements has to be solved. If the light planes are along the faces of a pyramid, the intersection of three thori needs to be computed.

The optical sensor described above has a number of advantages. Unlike prior LED-PSD-based sensors used in previous maglev wrists (Hollis et. al., 1991),(Berkelman et. al., 1996), and disclosed elsewhere (Salcudean, 1991) all referred to above, linear, not two-dimensional, PSDs are necessary. Also since the PSDs may be in the same plane, they can be mounted on a single printed circuit board, with better alignment and manufacturability than would be the case if a three-dimensional PSD structure were used.

The sensor embodiment described above relies upon time-domain multiplexing to sense the position of each of the light planes on each of the PSDs. It will be apparent that the same can be accomplished by frequency-domain multiplexing, where the light planes vary in intensity at different frequencies. Multiple light plane projections on the PSDs can be recovered by known techniques of filtering and signal processing.

Figure 10:
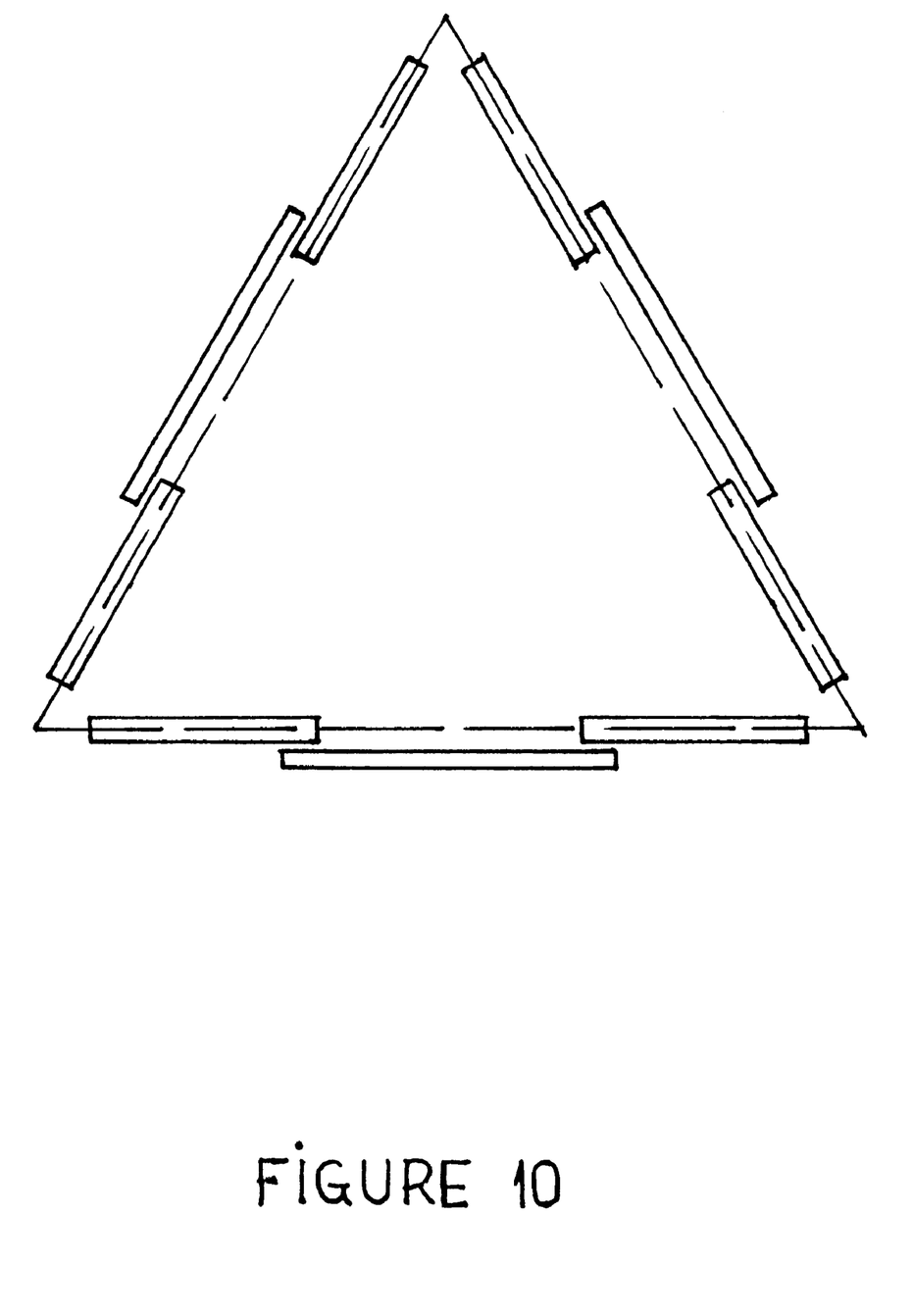
FIG. 10 is an illustration of a system for enlarging the field of the sensor by using multiple position sensing diodes (PSD) and staggering their positions.

The sensor embodiment described above relies on using just three PSDs. In order to enlarge the volume of detection, multiple PSDs can be staggered as shown in FIG. 10.

Figure 11:
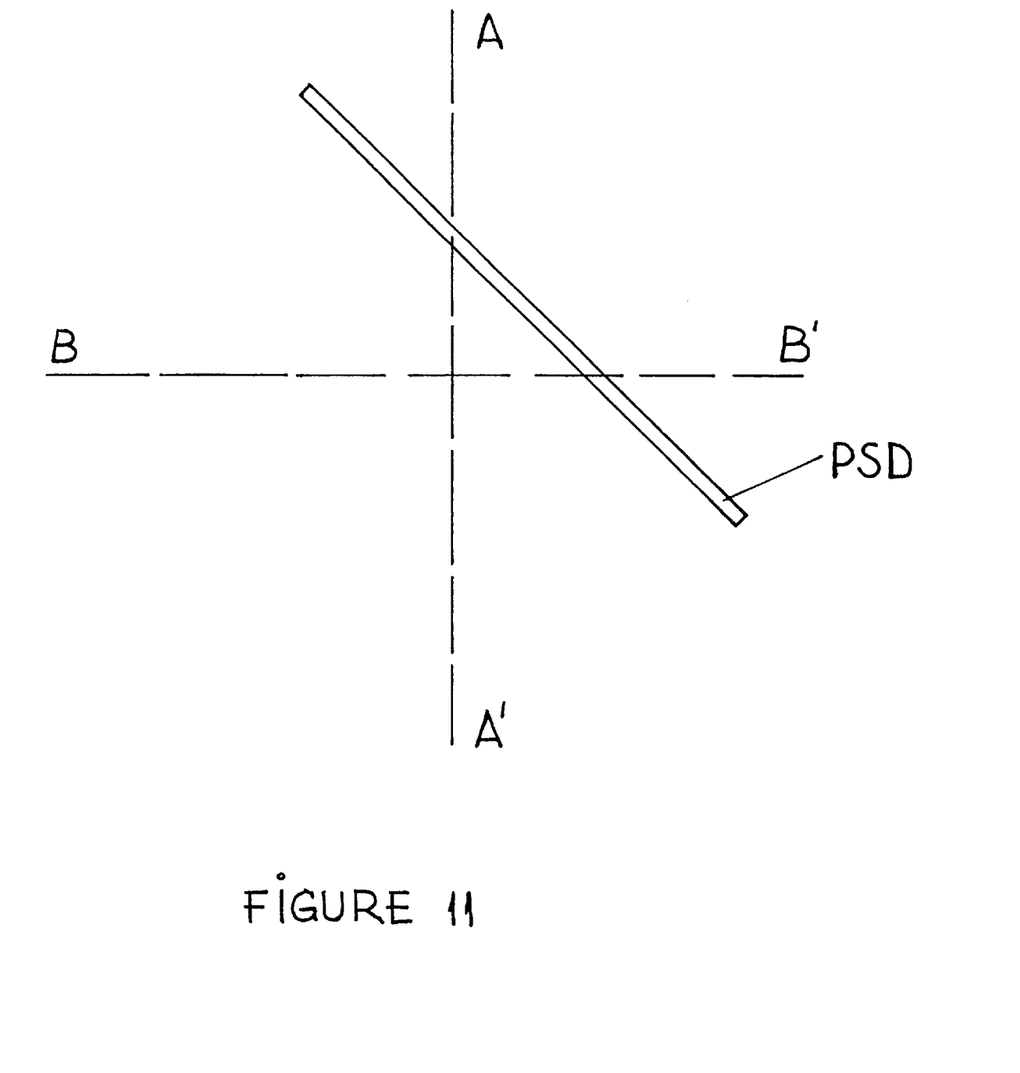
FIG. 11 illustrates the operation of an optical sensor for measuring two degrees of freedom using a single PSD and two planar light beams

The multiplexing concept described above can be used to measure motion in fewer degrees of freedom. For example, a two-dimensional planar translation sensor can be realized by using one PSD, and two multiplexed planar beams projected on its surface, as shown in FIG. 11. When light plane AA' is ON, the PSD detects motion essentially orthogonal to AA'. When light plane BB' is ON, the PSD detects motion essentially orthogonal to BB'. The position of the carrier of AA' and BB' is easily determined in this way.

Note that the above description of the optical position sensor and variants obvious to those skilled in the art may be used in many other instances, not only for position and orientation sensing for active joysticks. Motion can be detected for vibration isolation, a six-degree-of-freedom head tracker can be developed by using an infrared plane generator attached to the head of an operator and linear detectors on the ceiling, etc.

Controller Board

The novel actuator geometry, novel optical position sensor and novel actuator optimization presented above allow a designer to fit all the electronics components of a magnetically levitated device on a small controller board. For example, a 10.6"×5" PCB comprising the following:

analog electronics to amplify the PSD currents

LED transistor drivers analog-to-digital converters to read the input from the PSDs, with enough spare channels to accommodate the outputs of a six-degree-of-freedom force sensor that could be mounted on the flotor Pulse-Width-Modulation (PWM)-driven H-bridges for the coils one small fan for occasional forced air cooling, two serial and one parallel communication ports—a 50 MHz Intel 80C196NU microcontroller with associated EPROM and RAM.

The serial port can be used as a fast synchronous link allowing real-time control by a remote host. A second serial port is provided for the use of debugging tools. Several host communication methods are being provided, even though they take a significant amount of PCB space, for flexibility and exploration of the best approach to host connection. Other host communications standards such as the Universal Ser. Bus and the MIDI interface can be used.

The microcontroller performs basic I/O communications with a host. It generates the time-multiplexed light planes needed for optical sensing and the PWM signals needed to drive the coils, and it computes the basic control functions (direct kinematics, wrench vector computation according to a control law for mechanism emulation, and transformation of the control wrench into equivalent coil forces or currents). A flotor controller diagram is taught in (U.S. Pat. No. 4,874,998 issued to Hollis in October 1989) and in Hollis et. al., 1992 referred to above.

Haptic Interface Application

The range 6-DOF magnetically levitated device disclosed above, including novel geometry and packaging, optical sensor, and actuator optimization is envisaged as being used for example as (i) an intelligent haptic interface emulating simple mechanisms from its own library or downloaded from the host computer, such as limit stops, gimbals, sliders, various friction forces and simple geometric constraints that can be computed using its fixed-point microcontroller, (ii) a "dumb" haptic interface or teleoperation master, with the microcontroller board acting as an input-output board and most calculations being performed by the host or another external computer. The former mode does not require high communication rates with the host computer, while the second one does, as low-level data such as stiffnesses and forces are being passed between the host and the microcontroller board.

The characteristics of a specific device constructed in accordance with the present invention are summarized in Table 1:

TABLE 1

Summary of desk-top maglev joystick characteristics.

| | |
|---|---|
| Moving mass | 260 grams |
| Motion range | ±3 mm, ±5° |
| Maximum acceleration | >10 g |
| Maximum continuous force | 16 N |
| Peak force | 34 N |
| Power consumption for levitation | 1.6 W |
| Optical sensor resolution | approx. 10 microns |

Isotropic design

Optical sensor one order of magnitude cheaper than used in previous designs
Optimized actuator over 50% more efficient than in previous designs
All electronics except power supply integrated in the base with a 10.5" × 5.5" footprint The haptic interface has a motion range that exceeds that of many if not all similar passive devices, has high acceleration and force capability, and fits, complete with all electronics and a microcontroller, into a small enclosure tapering down from a handle 5.5" high to a base roughly two thirds the size of a sheet of paper.

Although the principle of Lorentz magnetic levitation (Hollis, 1989) teaches an actively levitated structure, it is often advantageous to include passive flotor supports.

With significant damping, the range of achievable stiffnesses by active controls can be improved, while a passive stiffness restoring the flotor to a nominal center can improve error recovery and safety.

Furthermore, it is recognized that in many applications, not all six degrees of freedom are required. Cubic structures and supports for voice-coil flotors with less than six degrees of freedom can be envisaged.

Having described the invention modifications will be evident to those skilled in the art without departing from the spirit of the invention as defined in the appended claims.

We claim:

1. A basic actuator structure comprising a stator formed by at least three pairs of opposing magnetic assemblies, each of said pairs of opposing magnetic assemblies defining a gap therebetween, a floater formed by at least three non-coplanar flat actuating coils positioned in fixed relationship relative to each other, one of said actuating coils being positioned in each of said gaps, each said gap having a width d and each said flat coil having a thickness $d_c$ measured parallel to said width d of its said gap and the ratio of coil thickness $d_c$ to gap width d is at least ⅓ ($d_c/d \geq ⅓$) such that said floator can move in directions perpendicular to said flat coils and thereby to provide a larger rattle space without sacrificing force applied between each of said flat coil and its said pair of opposed magnets.

2. A basic actuator structure as defined in claim 1 wherein said ratio is between ⅓ and ½.

3. An optical position sensor comprising at least one linear light position sensor mounted on one of a floater and a stator and a plurality of multiplexed planar light beam projectors on the other of the stator and floater, said multiplexed planar light beam projectors each projecting a planar light beam and being oriented to project said planar light beams at an angle to each other, said angle being greater than zero and said planar light beam projectors and said at least one linear light position sensor are relatively positioned when in a field of operation of said optical position sensor so that said planar light beams traverse said at least one light position sensor at a plurality of spaced locations and so that detection of intersection of said planar light beams with said at least one linear light position sensor permits calculation of the relative position and orientation of said stator and floater.

4. An optical position sensor as defined in claim 3 wherein said multiplexed planar light beam projectors are multiplexed in a domain selected from the group consisting of time domain multiplexing and frequency domain multiplexing.

5. An optical position sensor comprising a plurality of one dimensional light position sensors all of which extend along and detect light in the same plane and are mounted on one of a floater and a stator, a plurality of planar light beam projectors on the other of the stator and floater, said planar light beam projectors being oriented to project planar light beams at an angle to each other, said angle being greater than zero and said planar light beam projectors and said plurality of one dimensional light position sensors are relatively positioned when in a field of operation of said optical position sensor so that said planar light beams project towards said plane and traverse said plurality of one dimensional light position sensors at a plurality of spaced locations and so that detection of intersections of said planar light beams with said one dimensional position sensors permits calculation of the relative position and orientation of said stator and floater.

6. An optical position sensor as defined in claim 5 wherein said plurality of planar light beam projectors comprises two and said plurality of planar light beam projectors project two planar light beams that are substantially perpendicular.

* * * * *